United States Patent [19]

Born et al.

[11] 3,746,050

[45] July 17, 1973

[54] MULTI-LAYER PIPE

[75] Inventors: Kurt Born; Kurt-Walter Neuhoff, both of Mulheim; Karl Friedrich Wesemann, Homberg, all of Germany

[73] Assignee: Mannesmannrohren-Werke GmbH, Dusseldorf, Germany

[22] Filed: Sept. 3, 1970

[21] Appl. No.: 69,389

[30] Foreign Application Priority Data
Sept. 3, 1969 Germany................... P 19 44 587.5

[52] U.S. Cl.................. 138/150, 138/154, 138/171
[51] Int. Cl................................................ F16l 9/14
[58] Field of Search.................. 138/142, 143, 150, 138/154; 156/290, 295; 161/147; 113/120 S; 29/471.1

[56] References Cited
UNITED STATES PATENTS

| 1,840,305 | 1/1932 | Andrus et al. | 29/471.1 X |
| 1,934,065 | 11/1933 | Hermanson | 29/471.1 X |
| 2,111,791 | 3/1938 | Larson | 113/120 S |
| 2,363,967 | 11/1944 | Jasper | 113/120 S |
| 3,106,014 | 10/1963 | Brick et al. | 29/471.1 X |
| 3,332,134 | 7/1967 | Denis et al. | 29/471.1 X |
| 3,386,162 | 6/1968 | Woelfer et al. | 29/471.1 |
| 96,037 | 10/1869 | Root | 138/150 X |
| 418,154 | 12/1889 | Bayles | 138/150 X |
| 1,287,945 | 12/1918 | Ford | 138/150 |
| 2,311,138 | 2/1943 | Swartz | 138/143 X |
| 3,566,925 | 3/1971 | Sagara et al. | 138/143 |

Primary Examiner—Meyer Perlin
Assistant Examiner—Ronald C. Caposella
Attorney—Frederick E. Lange, William C. Babcock and Eugene L. Johnson

[57] ABSTRACT

A pipe having a multi-layer, spirally-wound pipe wall for use in very cold temperatures especially for natural gas pipelines or the like in Arctic regions, and a process for manufacturing the same.

6 Claims, 15 Drawing Figures

Patented July 17, 1973  3,746,050

Inventors:
KURT BORN
KURT W. NEUHOFF
KARL F. WESEMANN

Inventors:
KURT BORN
KURT W. NEUHOFF
KARL F. WESEMANN

Inventors:
KURT BORN
KURT W. NEUHOFF
KARL F. WESEMANN

Inventors:
KURT BORN
KURT W. NEUHOFF
KARL F. WESEMANN

Patented July 17, 1973 3,746,050

Inventors:
KURT BORN
KURT W. NEUHOFF
KARL F. WESEMANN

Inventors:
KURT BORN
KURT W. NEUHOFF
KARL F. WESEMANN

Inventors:
KURT BORN
KURT W. NEUHOFF
KARL F. WESEMANN

MULTI-LAYER PIPE

BACKGROUND OF THE INVENTION

The present invention relates to a large pipe with a multilayer, spirally-wound steel wall greater than 6 millimeters thick which, with usual dimensions given for wall thicknesses and diameters, is susceptible to brittle fracture under the effect of very cold temperatures such as occur in the pipelines for natural gas, or the like, in Arctic regions. The present invention further relates to a process for manufacturing such pipes.

With pipes with which the present invention relates are those generally having a diameter ranging from 1 to 4 meters, with the preferred diameters lying in the range of 2 to 2.5 meters, and having wall thicknesses in the order of 6 to 10 millimeters for the pipes having minimum diameters, and in the order of 20 to 25 millimeters for pipes having the preferred diameters. In general, the average wall thickness increases correspondingly with the increasing diameter of the pipe.

It is a known fact that pipelines of the type described above which are subjected to very low temperatures are especially endangered because of brittle fractures. In the case of pipelines with thick walls, for example 20 to 25 millimeters, sensitivity to brittle fracture must be taken into consideration. The reason for this is that in the case of relatively thick walled pipes, due to the internal pressure, a tri-axial stress condition is built up which favors the generation of brittle fractures, as opposed to the case of thin walled pipes, where the condition of stress is essentially bi-axial. The particular danger in the case of brittle fractures lies in the fact that a crack originating at any point in the pipeline can propogate with considerable speed over great stretches of the pipeline. There have been several reported cases in which lines several kilometers long were destroyed in this manner in a few seconds.

One way to minimize the danger of brittle fractures is by selecting steels for construction of the pipe that are not sensitive to brittle fracture. However, complete elimination of brittle fractures in this manner is not possible. In addition, steels which have a low tendency to brittle fracture are much more expensive. Consequently, it is normally economically prohibitive to construct layered pipes from this type of steel.

It is already known, according to U. S. Pat. No. 2,652,943, how to build large pipes constructed of multi-layer, spirally-wound sheets to minimize the disadvantages of thick walls in such types of large pipes. In the cited case, however, the spirally-welded seams for the individual sheets are offset from one another. A manufacturer of such a large pipe in this manner is quite expensive.

SUMMARY OF THE INVENTION

In contrast to the large pipes of the prior art, the pipe construction according to the present invention includes wall layers or sheet steel in the form of belts which are first welded together along small strips or fillets at their opposing longitudinal edges, and which are then, when the multi-layered wall has been spirally wound, joined together by a common welded seam running from the outer to the inner wall layer.

It is advantageous to construct the pipes of at least three layers in the lower ranges of wall thicknesses and to construct the pipes of at least four to five layers in the middle range. However, because of technical manufacturing considerations, it is not advantageous to make the individual layers with a thickness of less than 4 millimeters, although even such thin sheets would be useful when considering the technical goal advanced by the present invention. The greatest thickness for the individual layers should not, except in special cases, exceed 6 millimeters.

By constructing large pipes in accordance with the present invention, the danger of brittle fracture is restricted practically to the main spiral weld seam and the narrow welded strips or fillets at either side of the main weld seam. These strips make up only a very small portion of the total pipe wall. In addition, the present invention results in the possibility of limiting a crack originating in the wall area to the longitudinal direction, since, in an already known manner, spiral welds of these pipes are offset from one another on the stress weld between two adjoining pipes of the line, so that the crack can run only as far as this marginal weld where it encounters the multi-layer wall of the adjoining pipe which it cannot breach.

Also, in contrast to the prior art, the present invention includes a process for the construction of a large pipe having a multi-layer spirally-wound wall of the type described above. In accordance with this process, belts of equal width are laid one over the other, with their longitudinal edges bindingly joined and welded to one another in a narrow longitudinal region or fillet near their respective edges. Next, these edges are prepared for the spiral welding, especially by providing them with welding chamfers, and finally, the so constructed multi-layer belt is spirally twisted in a known manner, and the edges of the adjoining turns are welded together with a running weld through the entire thickness.

For welding the respective individual wall sheets together, two belts are laid one over the other with their longitudinal edges bindingly joined and welded. In the normal construction of four-layer spirally-welded pipes, one of the previously constructed two-layer belts is bindingly laid over another two-layer belt similarly constructed, and the two two-layer belts are welded together at their longitudinal edges.

An alternate way to construct four-layer spirally welded pipes is to first of all lay two belts one over the other and bindingly join and weld their longitudinal edges together, and then in a similar manner join and weld a single layer belt to each side of the two-layer belt previously constructed. After welding the individual belts together, the longitudinal edge strips are stress-annealed, preferably by induction, and a welding chamfer is provided on the edge of the four-layer belt for welding the belt together when it is spirally wound. Preferably, the entire process previously described is carried out in one continuous work operation.

After cutting off the endlessly constructed spirally woven pipe, it is of further advantage to weld together the ends of the pipe wall layers and to provide a welding chamfer for the circular weldment joining the two lengths of pipe together.

Accordingly, it is an object of the present invention to provide a large pipe in which the danger of brittle fracture, in spite of using steel which is sensitive to brittle fracture, is considerably minimized or eliminated, but which can nevertheless, be manufactured in a manner corresponding to the modern standards of pipe fabrication, and which is economically feasible.

Another object of the present invention is to provide a large pipe which can be adapted for use, especially for natural gas lines, or the like, in regions having an extremely cold climate, especially Arctic regions.

A further object of the present invention is to provide a process for constructing a large pipe having the above mentioned qualities.

These and other objects and advantages of the present invention will become apparent from the following detailed description of the preferred embodiment and upon reference to the drawings and the appended claims.

DESCRIPTION OF THE PREFERRED EMBODIMENT

Figure 1:
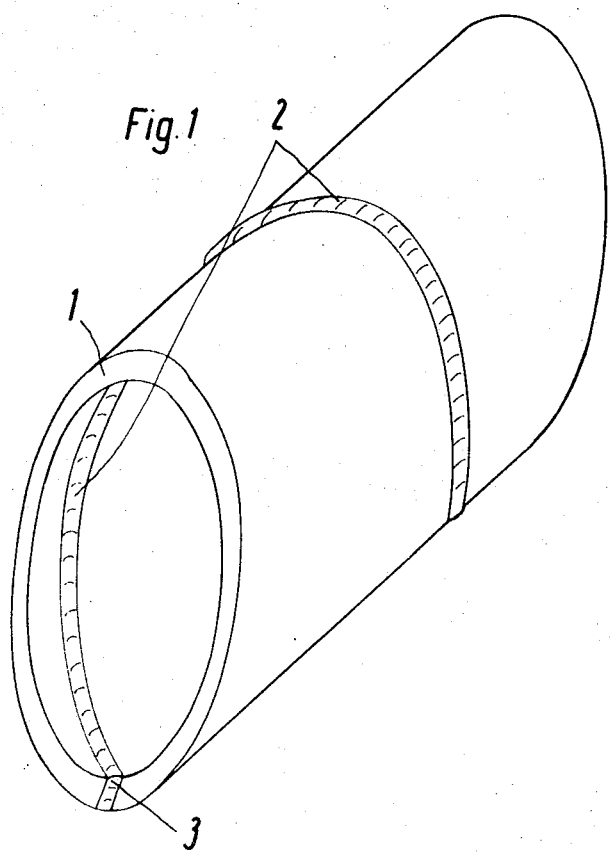
FIG. 1 is a perspective view of a spirally-wound pipe constructed by the method of the present invention.
Figure 2:
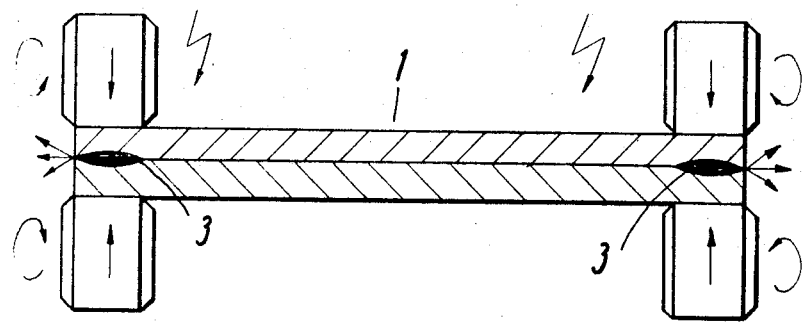
FIG. 2 shows the process of combining two single-layer belts together to produce a two-layer belt.

With reference to FIGS. 1–14 of the drawings, reference numeral 1 represents the individual belt layers, reference numeral 2 represents the common, running weld seam joining the spirally-wound layered belt into a relatively cylindrical configuration, and reference numeral 3 represents the narrow welds joining the individual belts of sheet steel together.

At the start of a continuous manufacturing process, four belts of sheet steel 1 are simultaneously pulled from a roll and placed one over the other. Although the advantages of the invention are not limited to the use of a particular kind of steel, the best steel to use are those which lend themselves well to welding. In this respect, uncoated steels can be used.

Preferably, however, lightly coated, high strength steels should be used which contain up to 2 percent manganese with a maximum, at any time, of 1% of some other additional coating element in which there is an especially low content of nitride and carbide formers such as tantalum, niobium, vanadium or titanium. The content of these elements should generally not exceed 0.2 percent. As an example, a steel with a maximum of 0.25 percent carbon, 1.6 percent manganese and, in combination, a total of 0.15 percent vanadium, titanium and niobium, is especially suited to pipes that are in accord with the invention. Because of economic and technical considerations, it is advantageous to construct all layers of a pipe from the same or similar materials.

Figure 3:
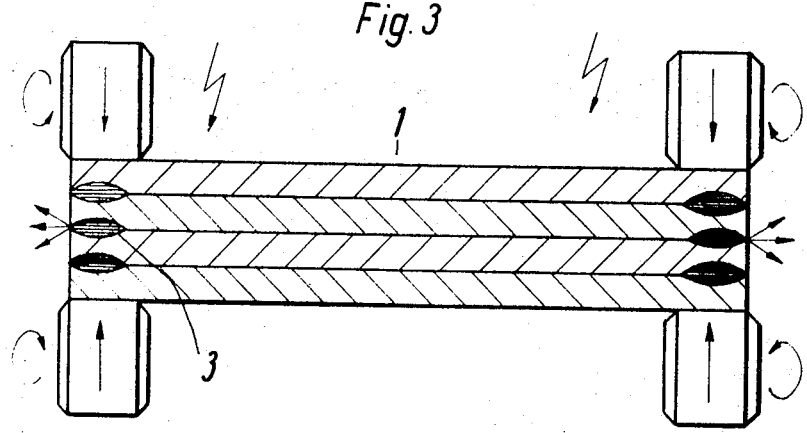
FIG. 3 shows the process of combining two two-layer belts together to produce a four-layer belt.
Figure 4:
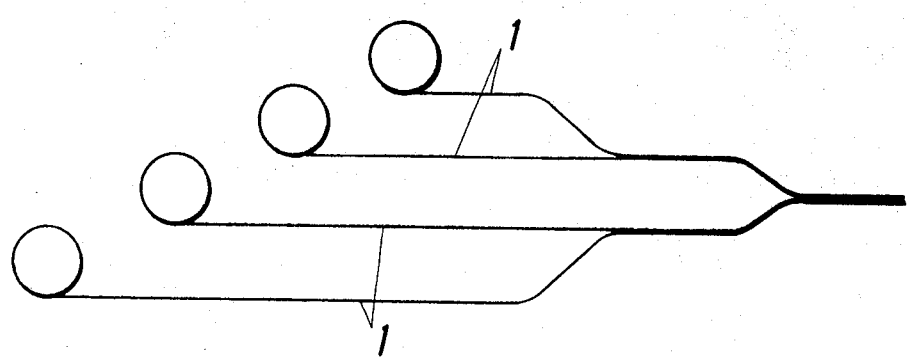
FIG. 4 schematically shows the process shown in FIGS. 2 and 3.

To maintain the continuous work process, additional rolls of steel are kept in readiness so that the beginning of a new roll can, in a known manner, be welded to the end of the used up roll. Corresponding arrangements for working and welding of the marginal longitudinal edges are provided, as well as the required feed lines which are in the form of slides. The guide rails for the individual belts are arranged one over the other. Each belt first runs through a rough alignment process, a longitudinal trim shear, a flashing device, and finally a fine alignment process. Then the belts are run out together in pairs so that now two belts lie one over the other. Finally, the two dual branches each run through a conventional roller type seam-weld machine (FIG. 2), where the overlying belts are welded together in the region of narrow longitudinal strips or fillets. Once past the welding device, the welded edge strips 3 are freed of scale and finally, both branches are run together so that now all four original belts lie one over the other in form of two dual-layer belts. Then, as shown in FIG. 3, the joining process continues through another roller seam-welding machine wherein the two double-layer belts are joined into a four-layer belt through the welding of their respective longitudinal marginal fillets. The route followed by the four belts up to their point of joining is represented schematically in FIG. 4.

Figure 5A:
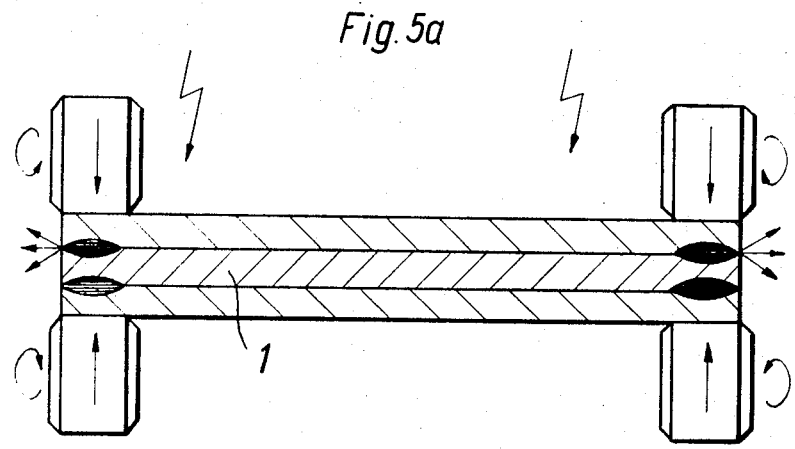
FIG. 5a shows the process of combining a two-layer and a single-layer belt to produce a three-layer belt.
Figure 5B:
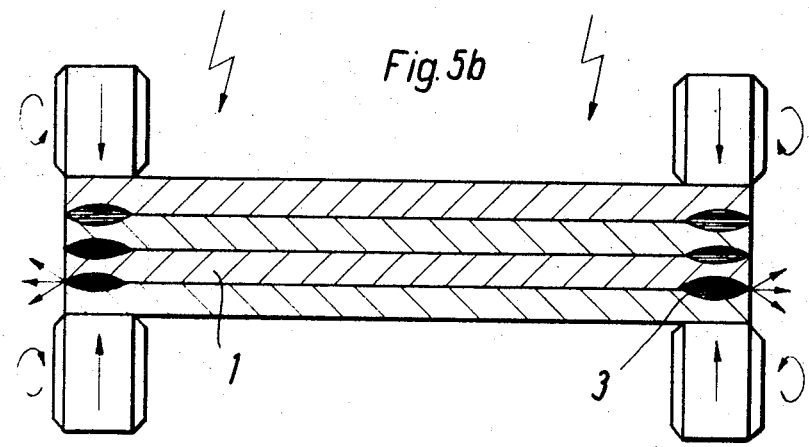
FIG. 5b shows the process of combining a three-layer belt and a single-layer belt to produce a four-layer belt.
Figure 6:
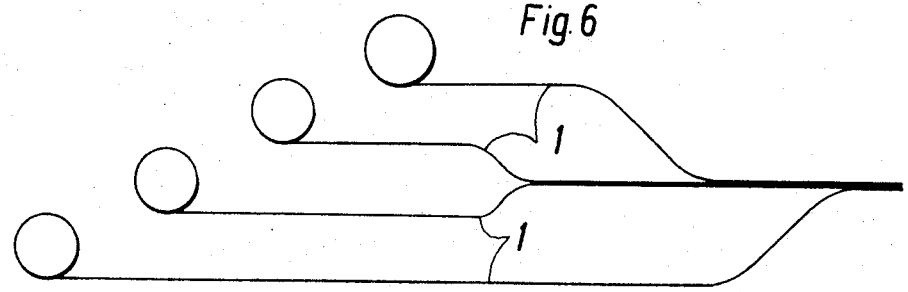
FIG. 6 schematically shows the process of FIGS. 5a and 5b.

As shown in FIGS. 5a, 5b and 6, it is also possible to construct a four-layer belt in such a manner that, of the four simultaneously run belts the two center belts are first joined and then the two outer belts are welded, one after the other, to the thus formed double layer belt. FIG. 5a shows a single belt being welded, near its margin, to the top of the dual-layer belt. Then in FIG. 5b, a second single belt is welded to the bottom of the now three-layer belt to produce a four-layer belt. FIG. 6 shows schematically the route of the four belts up to their point of joining. Note that the middle two are first joined, then the top belt is joined with the middle two, and finally, the bottom belt is joined with the middle two. The resultant four-layer belts, whether constructed by the process shown in FIGS. 2, 3 and 4, or whether constructed by the process shown in FIGS. 5a, 5b and 6, are identical.

As previously indicated and as evident from FIGS. 2, 3, 5a and 5b, the adjacent wall layers are joined together by welding along fillets 3 at their opposing longitudinal edges. As is further evident from these Figures, the portion of the opposing surfaces of adjacent layers between the fillets 3 are free from bonding. This permits relative expansion and contraction of adjacent wall layers due to temperature changes without danger of fracture.

Figure 7:
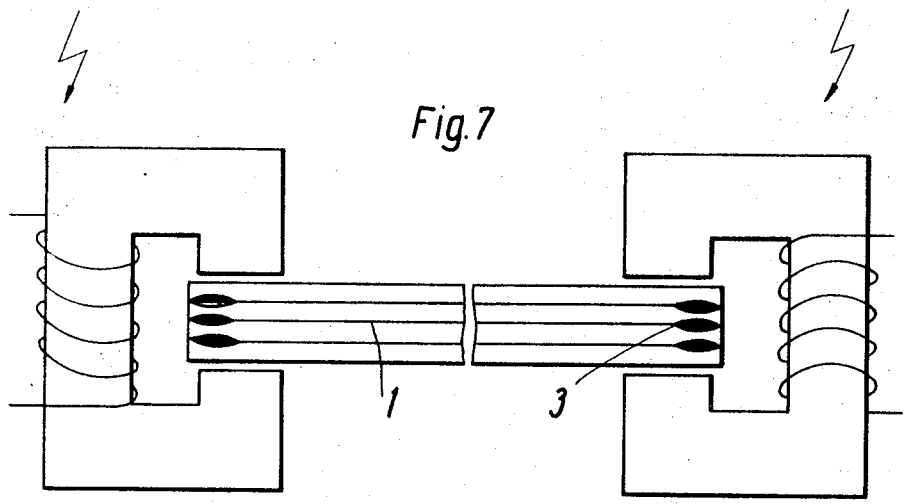
FIG. 7 shows the process of stress-annealing the edges of a four-layer belt by induction.
Figure 8:
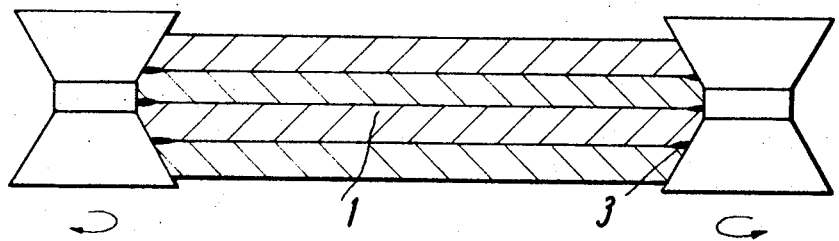
FIG. 8 is an end view of a four-layer belt being provided with welding chamfers.
Figure 9:
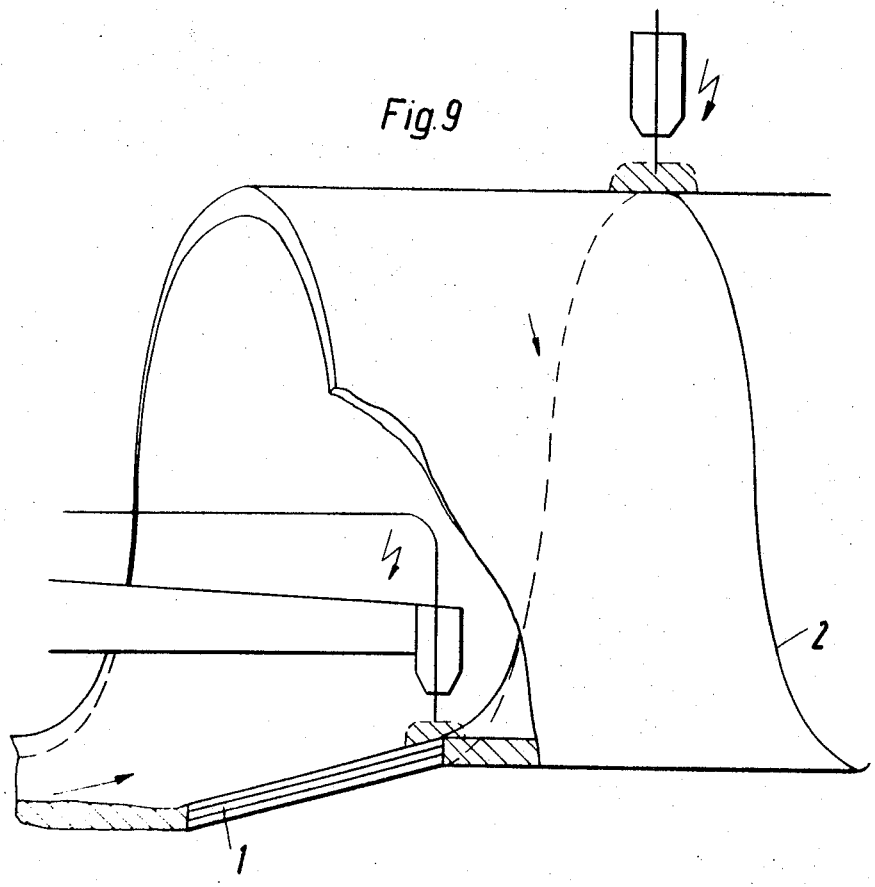
FIG. 9 shows the process of welding a multi-layer pipe into a spirally welded pipe.
Figure 10:
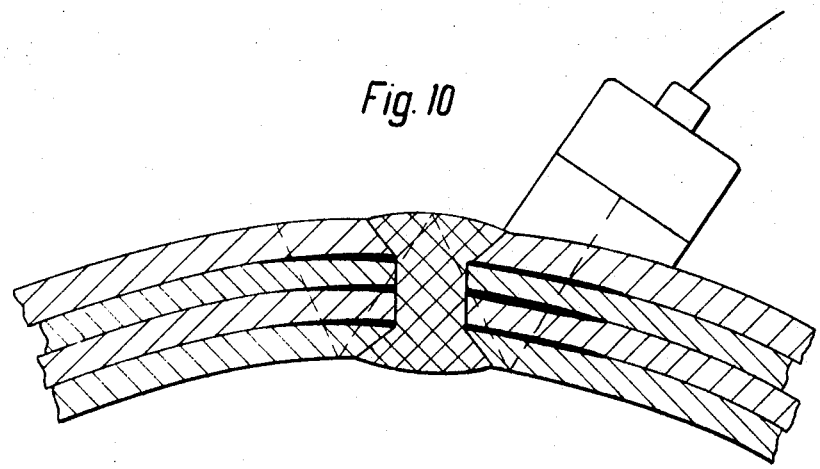
FIG. 10 schematically shows a four-layer pipe being tested by ultrasonic test equipment.
Figure 11:
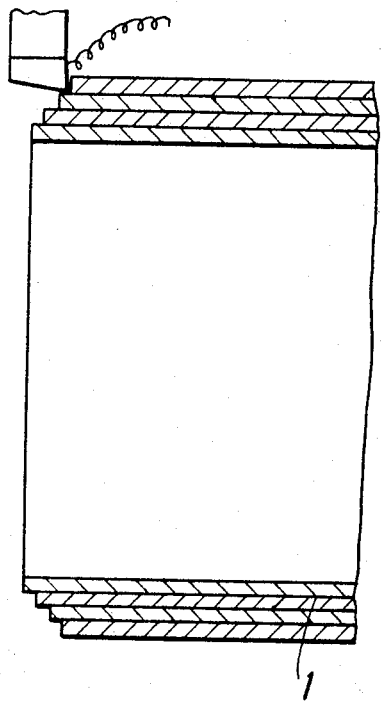
FIG. 11 shows a process of trimming back in step fashion individual layers of the pipe wall.

After the four belt layers are joined together in a form of a single four-layer belt, the edge strips, where the individual belts were welded together, are inductively annealed as shown in FIG. 7. Finally, the longitudinal edges of the welded four-layer belts are provided with welding chamfers by the grinding rollers as shown in FIG. 8. When the belt is shaped, in the usual manner, into the spirally welded pipe as shown in FIG. 9, the spiral seams are welded simultaneously on the inside and the outside. Although several welding heads may be used simultaneously, FIG. 9 shows only one.

Once the spiral seam is welded, it can be tested immediately in any convenient manner, e.g. with portable x-ray, magnetograph or ultrasonic test equipment. The ultrasonic test equipment is shown schematically in FIG. 10. In the penetration process of FIG. 10 the test can be carried out with diagonally impinging and multi-reflecting beams. This test is made possible by the fact that the four layers of the pipe wall are molten together into a single, homogeneous sheet through the welding process carried out on the strips or fillets to either side of the spirally welded seam.

Figure 12:
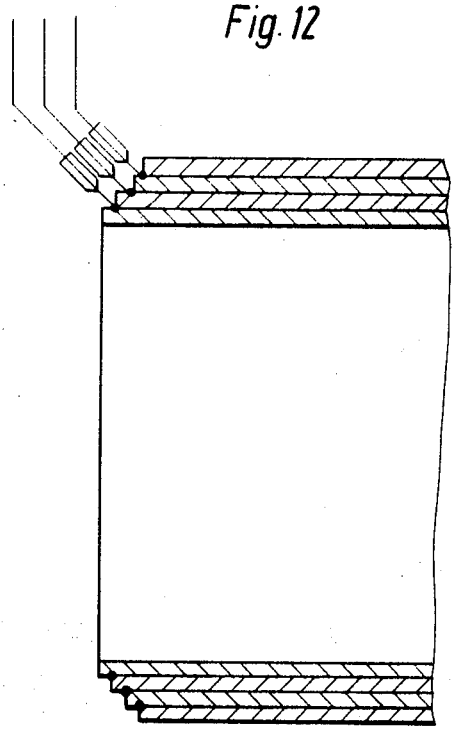
FIG. 12 shows a process of joining the individual layers by fill welding.
Figure 13:
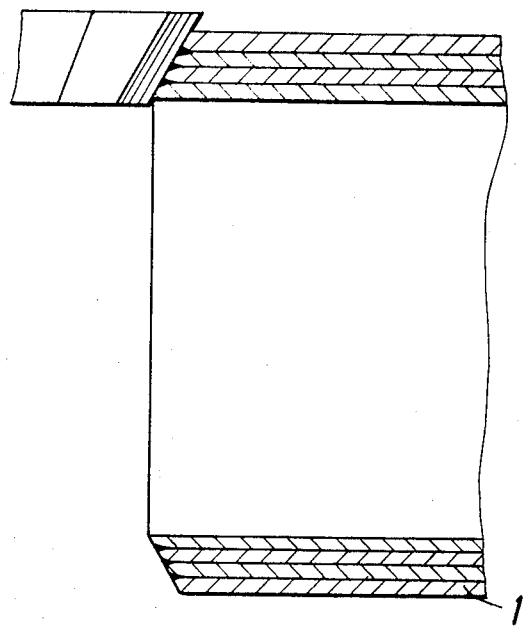
FIG. 13 shows a process providing a welding chamfer on one end of a spirally-wound pipe.
Figure 14:
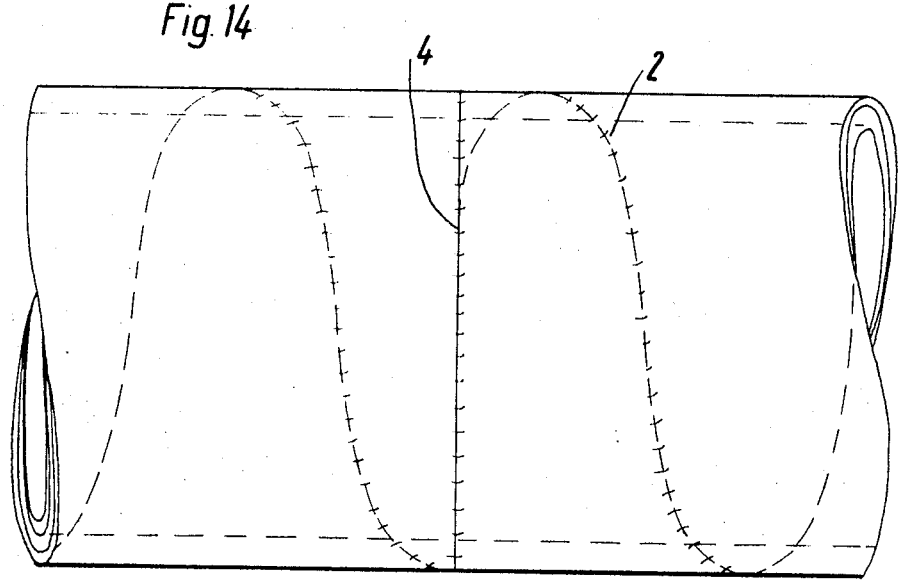
FIG. 14 shows two spirally welded pipes joined together by a circular weld.

After the individual sheets have been joined together, their longitudinal edges annealed, and the entire four-layer belt spirally wound and welded into an endless pipe, the endless pipe is cut off into individual pipes having a finite length. The two ends of these finite lengths of pipe are further processed by providing each end with a welding chamfer so that a number of individual pipe lengths may be joined together. First of all, in accordance with FIG. 11, starting from the outer facing of the individual pipes, the individual layers of the pipe wall are trimmed back in step fashion. After this, the individual layers of the pipe are joined together by fill welding as shown in FIG. 12 or by resistance welding on a narrow edge fillet similar to the earlier welding of the belt edges. Then, by debridement as shown in FIG. 13, the welding chamfer necessary to join several pipe lengths together is produced, and finally, as shown in FIG. 14, two pipe sections are joined or welded together by a circular weld which is represented by the reference numeral 4.

In summary, the present invention relates generally to a large pipe with a multi-layer spirally-wound wall. As described above, the wall of the pipe is constructed from a continuous belt of material which is spirally wound into a cylindrical shape and welded at the marginal edges of the continuous belt. The continuous belt in turn includes a plurality of individual belts which are joined together by welding along a marginal fillet.

The present invention also relates to the process for manufacturing the previously described pipe and generally includes the process steps of joining a plurality of belts together by welding adjacent belts together at their marginal edges, then spirally winding the resultant multi-layer belt to form a cylindrical pipe, and finally finishing the pipe by welding the spiral seams and supplying the pipe ends with welding chamfers.

This invention may be embodied in other forms not specifically shown in the preferred embodiment without departing from the spirit or essential characteristics thereof. The preferred embodiment is therefore to be considered as illustrative only with the scope of the invention being indicated by the appended claims and their equivalents.

What is claimed and desired to be secured by the United States Letters Patent is:

1. An improved pipe having a multilayer, spirally-wound steel wall greater than 6 millimeters thick comprising: a plurality of wall layers including at least an inner wall layer and an outer wall layer, with adjacent wall layers having a pair of opposing longitudinal edges and opposing surfaces, each of said wall layers being joined to adjacent wall layers by substantially continuous lineal welding along fillets at their opposing longitudinal edges, with the portion of opposing surfaces of adjacent wall layers between said fillets being free of bonding to permit limited relative expansion and contraction of adjacent wall layers due to changes in temperature, said plurality of wall layers being spirally formed with abutting longitudinal edges into a relatively cylindrical configuration and defining a continuous spiral edge, and a common welded seam running from said outer wall layer to said inner wall layer continuously along the entire length of said spiral edge for joining corresponding portions of said continuous spiral edge together to form said pipe.

2. The improved pipe of claim 1 wherein the pipe wall includes at least three layers.

3. The improved pipe of claim 2 wherein said pipe is constructed from weldable, non-coated mild steel.

4. The improved pipe of claim 2 wherein said pipe is constructed from high strength steel lightly coated with up to 2 percent manganese and up to 1 percent of an additional coating displaying a low content of carbide formers.

5. The improved pipe of claim 3 wherein all layers of the pipe wall are constructed of a similar material.

6. The improved pipe of claim 4 wherein all layers of the pipe wall are constructed of a similar material.

* * * * *